United States Patent
Dai et al.

(10) Patent No.: US 8,950,677 B2
(45) Date of Patent: Feb. 10, 2015

(54) BARCODE READING METHOD AND BARCODE READING DEVICE

(71) Applicants: Sintai Optical (Shenzhen) Co., Ltd., Shenzhen, Guandong Province (CN); Asia Optical International Ltd., Tortola (GB)

(72) Inventors: Li-Jiang Dai, Shenhen (CN); Chang-Feng Wang, Shenzhen (CN); Hui-Qing Chen, Shenzhen (CN); Bi-Yao Jian, Taichung (TW)

(73) Assignees: Sintai Optical (Shenzhen) Co., Ltd., Shenzhen, Guandong Province (CN); Asia Optical International Ltd., Tortola (VG)

( * ) Notice: Subject to any disclaimer, the term of this patent is extended or adjusted under 35 U.S.C. 154(b) by 0 days.

(21) Appl. No.: 13/975,402

(22) Filed: Aug. 26, 2013

(65) Prior Publication Data

US 2014/0070007 A1 Mar. 13, 2014

(30) Foreign Application Priority Data

Sep. 11, 2012 (TW) .............................. 101133201 A

(51) Int. Cl.
*G03B 3/10* (2006.01)
*G06K 7/10* (2006.01)
*G06K 7/015* (2006.01)

(52) U.S. Cl.
CPC ............ *G06K 7/10811* (2013.01); *G06K 7/015* (2013.01); *G06K 7/10722* (2013.01); *G06K 7/10831* (2013.01)
USPC .............. 235/462.23; 235/462.2; 235/462.22; 235/462.41; 235/462.11

(58) Field of Classification Search
USPC ............... 235/462.2, 462.22, 462.23, 462.41, 235/462.11
See application file for complete search history.

(56) References Cited

U.S. PATENT DOCUMENTS

2008/0296385 A1* 12/2008 Vinogradov ............. 235/462.22
2013/0075473 A1* 3/2013 Wang et al. .............. 235/462.41

* cited by examiner

*Primary Examiner* — Kristy A Haupt
(74) *Attorney, Agent, or Firm* — McClure, Qualey & Rodack, LLP

(57) ABSTRACT

A barcode reading method and a barcode reading device are provided. An image sensor is utilized to capture an image of a barcode via an optical lens, and then a triangulation method and an ideal lens imagining method are collocated to calculate the digital image so as to produce an optimum image distance. A distance between the image sensor and the optical lens is then adjusted in accordance with the optimum image distance, so that the barcode can be immediately and clearly imaged on the image sensor.

8 Claims, 5 Drawing Sheets

BARCODE READING METHOD AND BARCODE READING DEVICE

BACKGROUND OF THE INVENTION

1. Field of the Invention

The invention relates to a barcode reading method, and in particular to a barcode reading method and device, providing automatic focus adjustment.

2. Description of the Related Art

It is mostly commonly seen that barcodes are types of transactions and administration ways on commodities, which are utilized to record data of commodity items and selling prices. After a barcode on a commodity is scanned and decoded by a barcode reader, data of this scanned commodity is obtained and various subsequent processes and operations related to this commodity can be executed.

A conventional barcode reader includes an image sensor that is capable of capturing an image via a lens. An image of the barcode can be captured by the image sensor when the barcode is scanned, and image data corresponding to the barcode can be produced for recognition.

However, in the present barcode readers, the distance between the image sensor and the lens is fixed. Thus, a whole image of the barcode fails to form on the image sensor unless the barcode is sufficiently close to the lens. If the barcode and the lens have a longer distance therebetween, the barcode possibly cannot be clearly imaged on the image sensor, and consequently the correctness and success rate of the subsequent barcode recognition cannot be acquired. Moreover, the barcodes with various formats in the present market even increase complexity of readability of barcodes.

BRIEF SUMMARY OF THE INVENTION

The invention provides a barcode reading method and a barcode reading device for performing automatic focus adjustment, and the purposes of immediate focusing and decoding processes and more accurate and clear images can be obtained accordingly.

The barcode reading method in accordance with an exemplary embodiment of the invention includes (a) using an image sensor to capture a digital image of a barcode through an optical lens; (b) calculating the digital image; and (c) adjusting a distance between the image sensor and the optical lens to reimage the barcode on the image sensor.

In another exemplary embodiment, the image sensor and the optical lens are spaced an initial image distance apart. In the step (a), two calibration images are projected on the barcode at a first distance spaced apart from each other, so that the two calibration images are spaced a second distance apart in the captured digital image. In the step (b) an actual object distance is obtained from the first distance divided by the second distance and then multiplied by the initial image distance.

In yet another exemplary embodiment, a reciprocal of an optimum image distance is obtained by subtracting a reciprocal of the actual object distance from a reciprocal of a focal distance of the optical lens.

In another exemplary embodiment, in the step (a), a light source that is distinguishable from the digital image of the barcode is utilized to project a lighting frame toward the barcode via a frame body, in which the lighting frame is located at a middle of the barcode and assists the image sensor to capture the digital image of the barcode.

The barcode reading device in accordance with an exemplary embodiment of the invention includes an optical lens, an image sensor, a moving device, and a microcontroller. The image sensor is disposed on one side of the optical lens to capture a digital image of a barcode via an optical lens. The moving device is utilized to change a distance between the optical lens and the image sensor. The microcontroller is electrically connected to the image sensor and the moving device and utilized to receive, decode and calculate the digital image and to control the moving device.

In another exemplary embodiment, the barcode reading device further includes a light source that is distinguishable from the digital image of the barcode to project two calibration images toward the barcode, in which the two calibration images are spaced a first distance apart on the barcode, the two calibration images are spaced a second distance apart in the captured digital image, the image sensor and the optical lens are spaced an initial image distance apart, and the microcontroller is utilized to calculate an actual object distance which is obtained from the first distance divided by the second distance and then multiplied by the initial image distance.

In yet another exemplary embodiment, a reciprocal of an optimum image distance is calculated by the microcontroller by subtracting a reciprocal of the actual object distance from a reciprocal of a focal distance of the optical lens.

In another exemplary embodiment, the barcode reading device further includes a light source utilized to project a lighting frame toward the barcode via a frame body, and the lighting frame is located at a middle position of the barcode and assists the image sensor assisted to capture the digital image of the barcode.

In order to more precisely calculate and image the image distance of the barcode, the invention collocates a triangulation method and an ideal lens imagining method to calculate and decode the digital image. With the above-described technical features of the invention, the purposes of immediate focusing and decoding processes and more accurate and clear images can be obtained accordingly.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
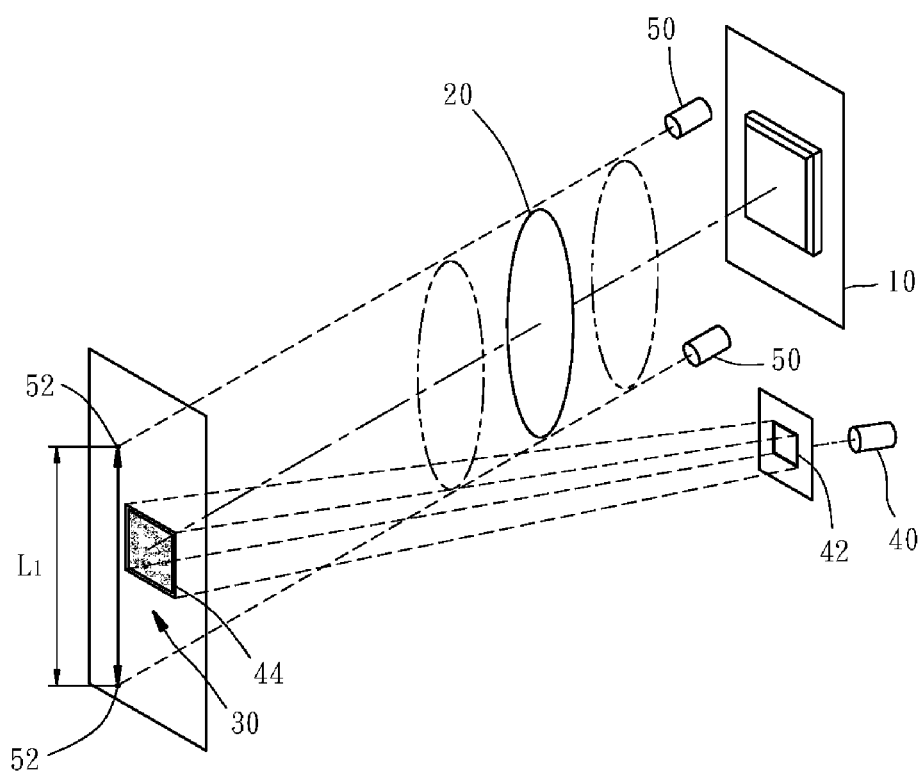
FIG. 1 is a schematic view of a preferred embodiment of the invention.
Figure 2:
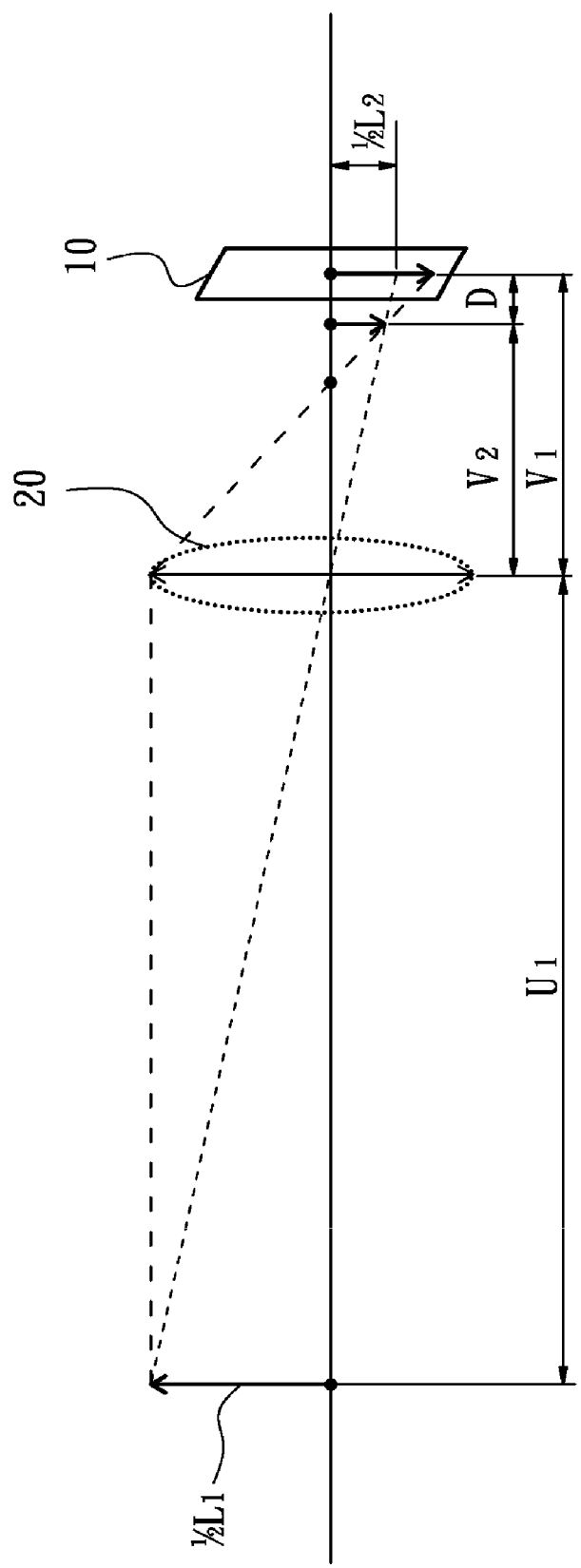
FIG. 2 is a schematic view of imaging of a preferred embodiment of the invention.

Referring to FIGS. 1, 2, 3 and 4, a preferred embodiment of the invention provides a barcode reading method and a barcode reading device. The barcode reading method includes the steps as follow.

Firstly, in a capturing step of an image of a barcode, an image sensor 10 is utilized to capture an image of a barcode 30 via an optical lens 20, in which the optical lens 20 itself is provided with an optical focal distance, and an initial image distance $V_1$ is provided between the image sensor 10 and the optical lens 20.

In the process of capturing the image of the barcode 30, a light source 40 is utilized to project a lighting frame 44 toward the barcode 30 via a frame body 42 so that the image sensor 10 can be correctly aligned with the barcode 30. In this preferred embodiment, the light source 40 is a light-emitting diode. The lighting frame 44 is located at the middle of the barcode 30. The light source 40 and the image of the barcode 30 are distinguishable so that the image sensor 10 can capture the image of the barcode 30 by the assist of the lighting frame 44, and then the data of a digital image of the barcode 30 can be produced.

Further, two light sources 50 that are located at the same side of the image sensor 10 are utilized to vertically project two calibration images 52 toward the barcode 30, and each of the two light sources 50 is distinguishable from the image of the barcode 30. In this preferred embodiment, the light sources 50 are laser diodes. The two calibration images 52 are spaced a first distance $L_1$, so that the two calibration images 52 are spaced a second distance $L_2$ in the data content of the digital image of the barcode 30 captured by the image sensor 10. The first distance $L_1$ can be a vertical distance as mentioned above, or a horizontal distance.

Secondly, in a calculating step of the digital image, when the digital image of the barcode 30 is captured by the image sensor 10, the data of the digital image is calculated and decoded by a microcontroller 60 that is electrically connected to the image sensor 10, collocating with a triangulation method and an ideal lens imagining method. The triangulation method applied by the invention is expressed as the following equation (A), wherein an actual object distance $U_1$ is obtained from the first distance $L_1$ divided by the second distance $L_2$ and then multiplied by the initial image distance $V_1$.

$$U_1 = (L_1/L_2) * V_1 \quad (A)$$

The ideal lens imagining method applied by the invention is expressed as the following equation (B), wherein a reciprocal of an optimum image distance $V_2$ is obtained by subtracting a reciprocal of the actual object distance $U_1$ from a reciprocal of a focal distance f of the optical lens 20.

$$\frac{1}{V_2} = \frac{1}{f} - \frac{1}{U_1} \quad (B)$$

A travel distance D of the image of the barcode 30 can be obtained by calculating the difference between the initial image distance $V_1$ and the optimum image distance $V_2$.

Figure 3:
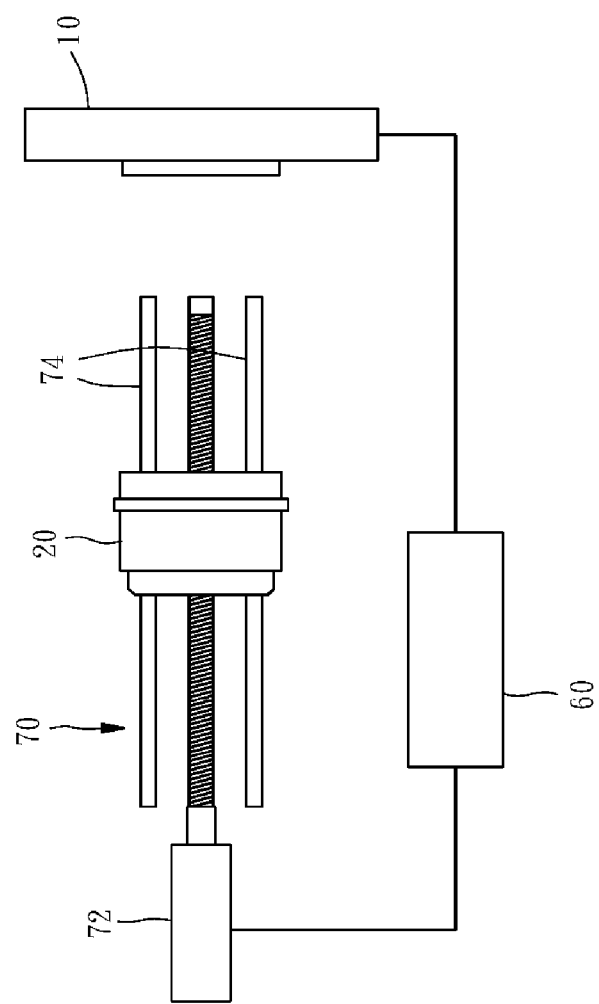
FIG. 3 is a schematic view of a system composition of a preferred embodiment of the invention.
Figure 4:
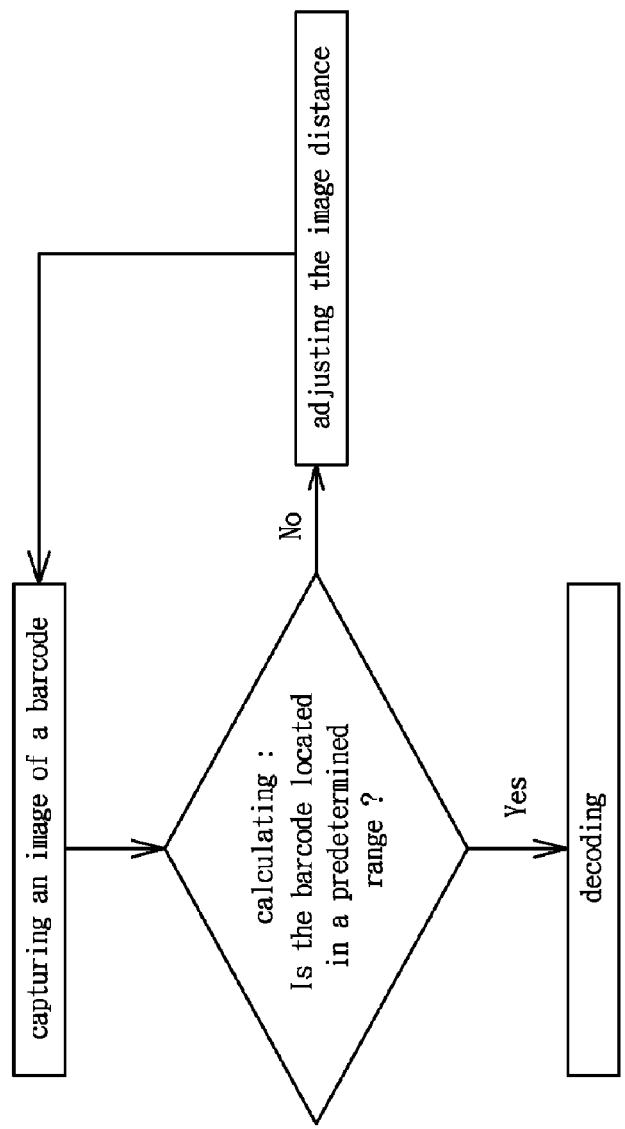
FIG. 4 is a flow chart of a preferred embodiment of the invention.

Thirdly, in an adjusting image distance step, a moving device 70 is utilized to change a distance between the optical lens 20 and the image sensor 10. As shown in FIG. 3, the optical lens 20 can be moved at the travel distance in the above-described calculating step by the moving device 70 to reimage the barcode 30 on the image sensor 10, so that a clear digitalized barcode image can be produced by the image sensor 10. In the moving device 70 of this preferred embodiment, a step motor 72 is utilized to drive the optical lens 20 disposed on a rail assembly 74. The moving device 70 is electrically connected to the microcontroller 60. The microcontroller 60 controls the moving device 70 to move the optical lens 20 with respect to the image sensor 10 at the travel distance D. Alternatively, moving the image sensor 10 can attain the same purpose of the invention.

Figure 5:
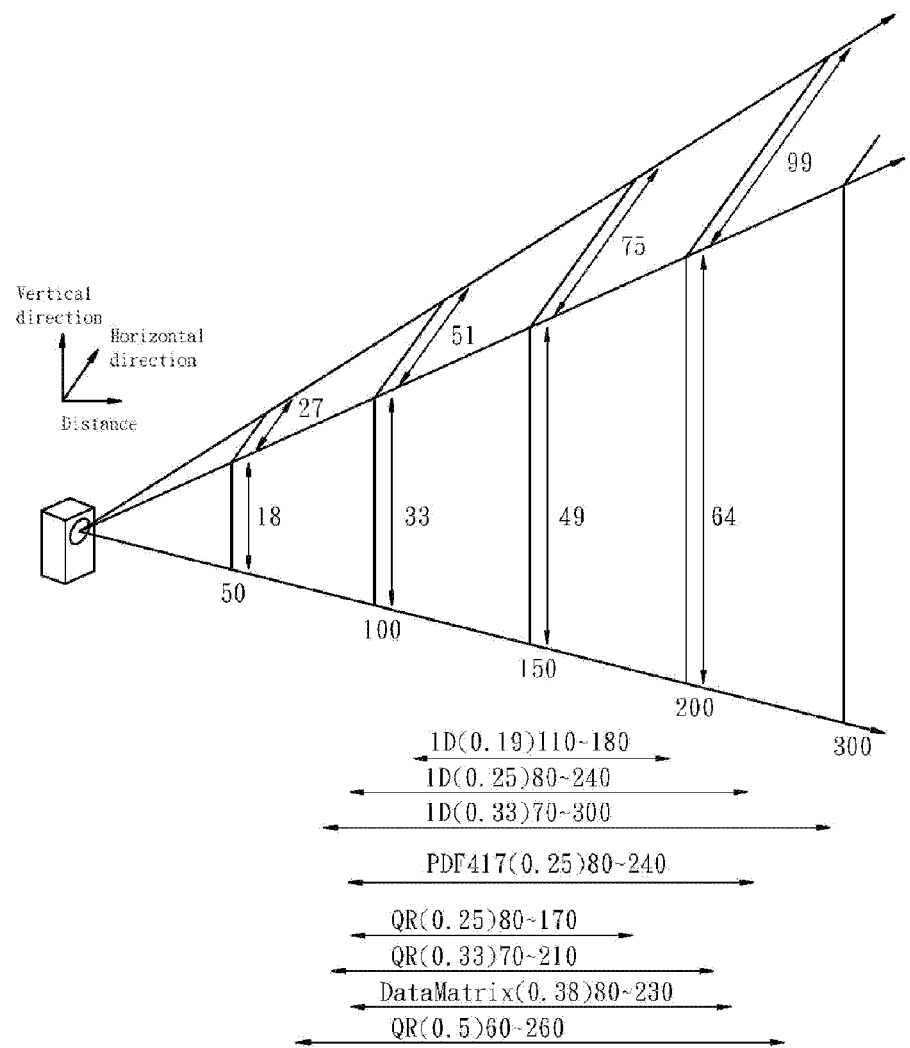
FIG. 5 is an illustration diagram of a preferred embodiment of the invention.

In the above-described method, the calculating step is utilized to decode the digital image of the barcode 30, adjusting the optical lens 20 to a position capable of forming clear image, regardless of the distances between the barcode 30, the image sensor 10, and the optical lens 20. FIG. 5 is a schematic view showing optimum detection ranges of barcodes with various formats. From FIG. 5, it is understood that the optimum detection distance between the barcode and the image sensor is varied, depending on the formats of barcodes. Similarly, the optimum range of the positions of the barcode and image sensor depends on the formats of barcodes. Accordingly, with the adjustable distance between the optical lens 20 and the barcode 30 of the invention, the image sensor can clearly and accurately capture the barcodes of various formats, thereby providing automatic focusing adjustment and allowing the invention to be extensively applied in different fields.

Moreover, by using the method of capturing and calculating the digital image data of the barcode to perform the focusing function, operations such as decoding and controlling of focus can be completely executed by software so that image focusing process can be more convenient and immediate, and users do not have to visually inspect the barcode so that focusing effect can be more accurate and clear.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A barcode reading method, comprising:
   (a) using an image sensor to capture a digital image of a barcode through an optical lens, wherein the image sensor and the optical lens are spaced an initial image distance apart, two calibration images are projected on the barcode at a first distance spaced apart from each other, so that the two calibration images are spaced a second distance apart in the captured digital image;
   (b) calculating the digital image; and
   (c) adjusting a distance between the image sensor and the optical lens to reimage the barcode on the image sensor.

2. The barcode reading method as claimed in claim 1, wherein in the step (b) an actual object distance is obtained from the first distance divided by the second distance and then multiplied by the initial image distance.

3. The barcode reading method as claimed in claim 2, wherein a reciprocal of an optimum image distance is obtained by subtracting a reciprocal of the actual object distance from a reciprocal of a focal distance of the optical lens.

4. The barcode reading method as claimed in claim 1, wherein in the step (a) a light source that is distinguishable from the digital image of the barcode is utilized to project a lighting frame toward the barcode via a frame body, in which the lighting frame is located at a middle of the barcode and assists the image sensor to capture the digital image of the barcode.

5. A barcode reading device, comprising:
   an optical lens;
   an image sensor disposed on one side of the optical lens to capture a digital image of a barcode via the optical lens;
   a moving device utilized to change a distance between the optical lens and the image sensor;
   a light source distinguishable from the digital image of the barcode to project two calibration images toward the barcode, in which the two calibration images are spaced a first distance apart on the barcode, the two calibration images are spaced a second distance apart in the captured digital image, the image sensor and the optical lens are spaced an initial image distance apart; and a microcontroller electrically connected to the image sensor and the moving device and utilized to receive, decode and calculate the digital image and to control the moving device.

6. The barcode reading device as claimed in claim 5, wherein the microcontroller is utilized to calculate an actual object distance which is obtained from the first distance divided by the second distance and then multiplied by the initial image distance.

7. The barcode reading device as claimed in claim 6, wherein a reciprocal of an optimum image distance is calculated by the microcontroller by subtracting a reciprocal of the actual object distance from a reciprocal of a focal distance of the optical lens.

8. The barcode reading device as claimed in claim 5 further comprising a light source utilized to project a lighting frame toward the barcode via a frame body, and the lighting frame is located at a middle of the barcode and assists the image sensor assisted to capture the digital image of the barcode.

* * * * *